United States Patent Office 3,029,211
Patented Apr. 10, 1962

3,029,211
COMPOSITION COMPRISING A VINYLIDENE POLYMER AND A COMPOUND CONTAINING BORON, OXYGEN AND SILICON
Stephen J. Groszos, Naperville, Ill., assignor to American Cyanamid Company, New York, N.Y., a corporation of Maine
No Drawing. Application Nov. 19, 1958, Ser. No. 774,832, now Patent No. 2,967,877, dated Jan. 10, 1961, which is a division of application Ser. No. 685,826, Sept. 24, 1957, now Patent No. 2,915,543, dated Dec. 1, 1959. Divided and this application Mar. 30, 1960, Ser. No. 18,470
4 Claims. (Cl. 260—29.1)

This application is a division of my copending application Serial No. 774,832, filed November 19, 1958, as a division of application Serial No. 685,826, filed September 24, 1957, now Patent No. 2,915,543, dated December 1, 1959. Application Serial No. 774,832 has now matured into Patent No. 2,967,877, dated January 10, 1961.

This invention relates to plasticized compositions and, more particularly, to compositions comprising (1) a polymer selected from the class consisting of polyvinyl halides and polyvinylidene halides and (2) a compound containing boron, oxygen and silicon.

The compounds used in practicing this invention may be represented graphically by the following general formula:

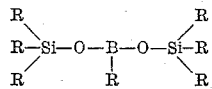

wherein each R represents a radical of the class consisting of aryl, alkaryl, and halogenoaryl radicals, and is the same or different. An illustrative example of a compound embraced by Formula I is di-(triphenylsilyl)phenylboronate, which also properly may be designated as triphenylsilylphenylboronate, and the formula for which is

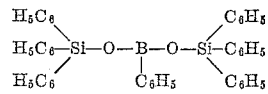

The compounds employed in practicing the present invention should not be confused with the polymeric reaction products of a hydrocarbosilanediol and a hydrocarbon-boronic acid, which polymeric reaction products are described in Upson Patent No. 2,517,945, dated August 8, 1950, as "having as recurring structural units

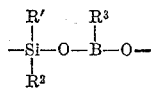

where R', R², and R³ are monovalent hydrocarbon radicals." Upson obtains his polymers by heating "a mixture of a polyhydric organosilanol, for example, diphenylsilanediol, and a boronic acid, for example, benzeneboronic acid, under atmospheric pressure in a reaction vessel at a temperature sufficient to melt the reactants and to vaporize the water which is formed, preferably at 170° to 260° C. When the evolution of water subsides, the resulting viscous molten polymer is heated under reduced pressure to remove any water vapor or other volatile products remaining in the mixture. The polymer is then allowed to cool to room temperature." Upson also states that "Modifying agents such as monohydric organosilanols (R₃SiOH) and boronic [borinic] acids (R₂BOH) may be added to the reactants either at the start or at any stage of the reaction. These agents act to terminate polymer chains and are accordingly useful in controlling the molecular weight of the polymers."

Illustrative examples of aryl radicals represented by R in Formula I are phenyl, biphenylyl or xenyl, naphthyl, etc.; of alkaryl radicals, tolyl, xylyl, ethylphenyl, propylphenyl, isopropylphenyl, butylphenyl, etc.; while illustrative examples of halogenoaryl radicals represented by R in Formula I are the halogenated (chlorinated, brominated, fluorinated and iodinated) aryl radicals, including the perhalogenated radicals, corresponding to the aryl radicals mentioned above by way of example. Still other examples of radicals represented by R in Formula I will be apparent to those skilled in the art from the foregoing illustrative examples.

The symmetrical compounds used in practicing this invention can be prepared, for example, by reacting together (1) a boronic acid represented by the general formula III 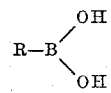

where R has the same meaning as given above with reference to Formula I and (2) a silicon compound represented by the general formula IV 

wherein each R has the same meaning as given above with reference to Formula I, and Y represents a radical of the class consisting of —OH and —NH₂ radicals, the boronic acid of (1) and the silicon compound of (2) being employed in a molar ratio of at least 2 moles of the latter per mole of the former; and isolating a compound represented by Formula II from the resulting reaction mass.

Unsymmetrical compounds employed in practicing the invention can be prepared, for example, by using a mixture of different starting reactants; that is, compounds wherein the aryl, alkaryl, or halogenoaryl substituents are different. Thus, one can react, for instance, one mole of phenylboronic acid with two moles of tri-(p-tolyl)silanol to produce di-(tri-p-tolylsilyl)phenylboronate.

In order that those skilled in the art may better understand how the present invention can be carried into effect, the following examples are given by way of illustration and not by way of limitation. All parts and percentages are by weight unless otherwise indicated.

EXAMPLE 1

V
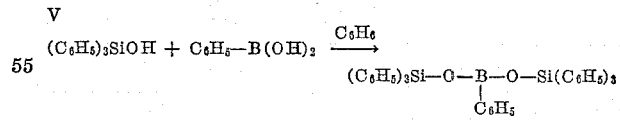

Into a three-necked flask equipped with a stirrer and a condenser provided with a Dean and Stark trap are charged 27.23 g. (0.1 mole) triphenylsilanol [prepared by hydrolysis of (C₆H₅)₃SiCl], 6.09 g. (0.05 mole) phenylboronic acid and 75 ml. benzene. The reaction mixture is refluxed until 1.4 ml. water has azeotroped into the trap (theoretical water of reaction is 1.8 ml.). Benzene is then removed from the reaction mass until a filterable slurry remains. The solid fraction is filtered off and recrystallized from hexane to give white crystals, M.P. 132°–133° C. Infrared analysis confirms the product as being di-(triphenylsilyl)phenylboronate. The total yield of recrystallized product is 71% of the theoretical, which corresponds to the percent (of the total) of water of reaction obtained.

Analysis

|  | C | H |
|---|---|---|
| Calculated for C₄₂H₃₅BSi₂O₂ | 79.98 | 5.52 |
| Found { a | 78.24 | 5.59 |
| b | 79.45 | 5.82 |

a Sample is mixed with CuO prior to combustion.
b A rapid C+H determination is used.

EXAMPLE 2

Di-(tri-m-chlorophenylsilyl)phenylboronate is obtained by following the method of Example 1 but using 0.1 mole of tri-(m-chlorophenyl)silanol instead of 0.1 mole of triphenylsilanol. The structure is confirmed by infrared analysis, and the total yield of recrystallized product is more than 65% of the theoretical.

EXAMPLE 3

A. Preparation of Triphenylsilylamine

VI  $(C_6H_5)_3SiCl + NH_3 \rightarrow (C_6H_5)_3SiNH_2 + HCl$

Triphenylsilylamine is prepared (using the method of Kraus and Rosen) by liquefying an excess of ammonia in a flask charged with 88.2 g. (0.3 mole) triphenylchlorosilane. After stirring for two hours at low temperatures, ca. −70° C., the reaction mixture is allowed to warm to room temperature. The light brown solid which remains after the excess ammonia has vaporized is then extracted for 2 hours with petroleum ether, using a Soxhlet extractor. The resulting orange solution is heated with decolorizing carbon and filtered hot. On standing, 27.89 g. triphenylsilylamine crystallizes out of the light yellow solution. Concentration of the filtrate results in an additional crop of 13.53 g. of the colorless solid, M.P. 53°–55° C. The total yield is 50% of the theoretical.

B. Preparation of Di-(triphenylsilyl)phenylboronate

VII

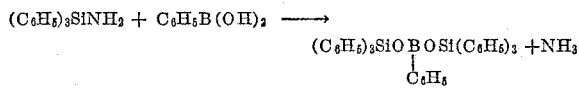

$(C_6H_5)_3SiNH_2 + C_6H_5B(OH)_2 \longrightarrow$ $(C_6H_5)_3SiO\underset{\underset{C_6H_5}{|}}{B}OSi(C_6H_5)_3 + NH_3$ A three-necked flask, equipped with a stirrer, nitrogen-inlet and a Dean and Stark trap with a condenser and drying tube, is charged with 27.89 g. (0.101 mole) triphenylsilylamine, 6.09 g. (0.05 mole) phenylboronic acid and 75 ml. benzene. The reaction mixture is heated to reflux and after two hours at reflux only a negligible amount of water has collected in the trap. Tests with HCl at the exit drying tube indicate the evolution of ammonia during the reaction. On cooling the concentrated benzene solution, a colorless crystalline solid is obtained. Infrared analysis of a recrystallized portion of the solid, M.P. 131.5°–133° C., confirms the identity of the product as di-(triphenylsilyl)phenylboronate.

Analysis

|  | C | H |
|---|---|---|
| Calculated for C₄₂H₃₅BSi₂O₂ | 79.98 | 5.52 |
| Found | 77.90 | ¹5.54 |

¹ Mixed in a capsule with CuO.

It was surprising and unobvious that di-(triphenylsilyl)phenylboronate would be the product of the foregoing reaction, since normally it would be expected that the product would be N,N′-(triphenylsilyl)phenylboronamide.

EXAMPLE 4

Example 1 is repeated exactly but using 0.1 mole tri-p-tolylsilanol and 0.05 mole m-chlorophenylboronic acid. The structure of the product is confirmed by infrared analysis as being di-(tri-p-tolylsilyl)m-chlorophenylboronate. The product, after recrystallization, is obtained in a yield corresponding to about 70% of the theoretical.

EXAMPLE 5

| | Parts |
|---|---|
| Polyvinyl chloride (gamma polyvinyl chloride) | 100 |
| Di-(triphenylsilyl)phenylboronate | 50 | are mixed together on a standard rubber mill at about 135° C. until a sheet, 40 to 50 mils thick, is obtained. The resulting sheet is flexible, tough, somewhat elastic and has good tensile strength characteristics. It is suitable for uses where polyvinyl chloride compositions are now employed.

One can replace part of the di-(triphenylsilyl)phenylboronate used in the above formulation, for instance up to 90% by weight thereof (45 parts), with other plasticizers for polyvinyl chloride, e.g., a saturated aliphatic hydrocarbon triester of cyanuric acid, especially a trialkyl cyanurate and more particularly one containing not less than 4 and not more than 6 carbon atoms in each alkyl radical. The cyanuric triester not only functions as a plasticizer for polyvinyl chloride but also renders the plasticized composition resistant to discoloration under the action of heat.

The compounds involved in practicing this invention can be used in plasticized polyvinyl halide (chloride, bromide, etc.) and polyvinylidene halide (chloride, bromide, etc.) compositions, alone or with other plasticizers or modifiers, in amounts corresponding to from 2% to 65% by weight of the plasticized composition.

I claim:

1. A composition comprising (1) a polymer selected from the class consisting of polyvinyl halides and polyvinylidene halides and (2) a compound represented by the general formula

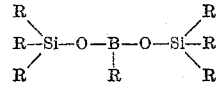

$$\underset{R}{\overset{R}{R-Si}}-O-\underset{R}{B}-O-\underset{R}{\overset{R}{Si-R}}$$

wherein each R represents a radical selected from the class consisting of aryl, alkaryl, and halogenoaryl radicals, the compound of (2) constituting from 2% to 65% by weight of the aforesaid composition.

2. A composition as in claim 1 wherein the polyvinyl compound of (1) is polyvinyl chloride.

3. A composition as in claim 1 wherein the compound of (2) is di-(triphenylsilyl)phenylboronate.

4. A composition comprising (1) polyvinyl chloride and (2) a plasticizer for said polyvinyl chloride comprising di-(triphenylsilyl)phenylboronate, the plasticizer of (2) constituting from 2% to 65% by weight of the plasticized composition.

References Cited in the file of this patent

UNITED STATES PATENTS 2,967,877    Groszos _____ Jan. 10, 1961

UNITED STATES PATENT OFFICE
CERTIFICATE OF CORRECTION

Patent No. 3,029,211                                April 10, 1962

Stephen J. Groszos

It is hereby certified that error appears in the above numbered patent requiring correction and that the said Letters Patent should read as corrected below.

Column 1, lines 29 to 33, to the left of the formula insert -- I --; lines 41 to 44, to the left of the formula insert -- II --; column 2, line 38, for "II" read -- I --.

Signed and sealed this 17th day of July 1962.

Attest:

ERNEST W. SWIDER
Attesting Officer

DAVID L. LADD
Commissioner of Patents